UNITED STATES PATENT OFFICE.

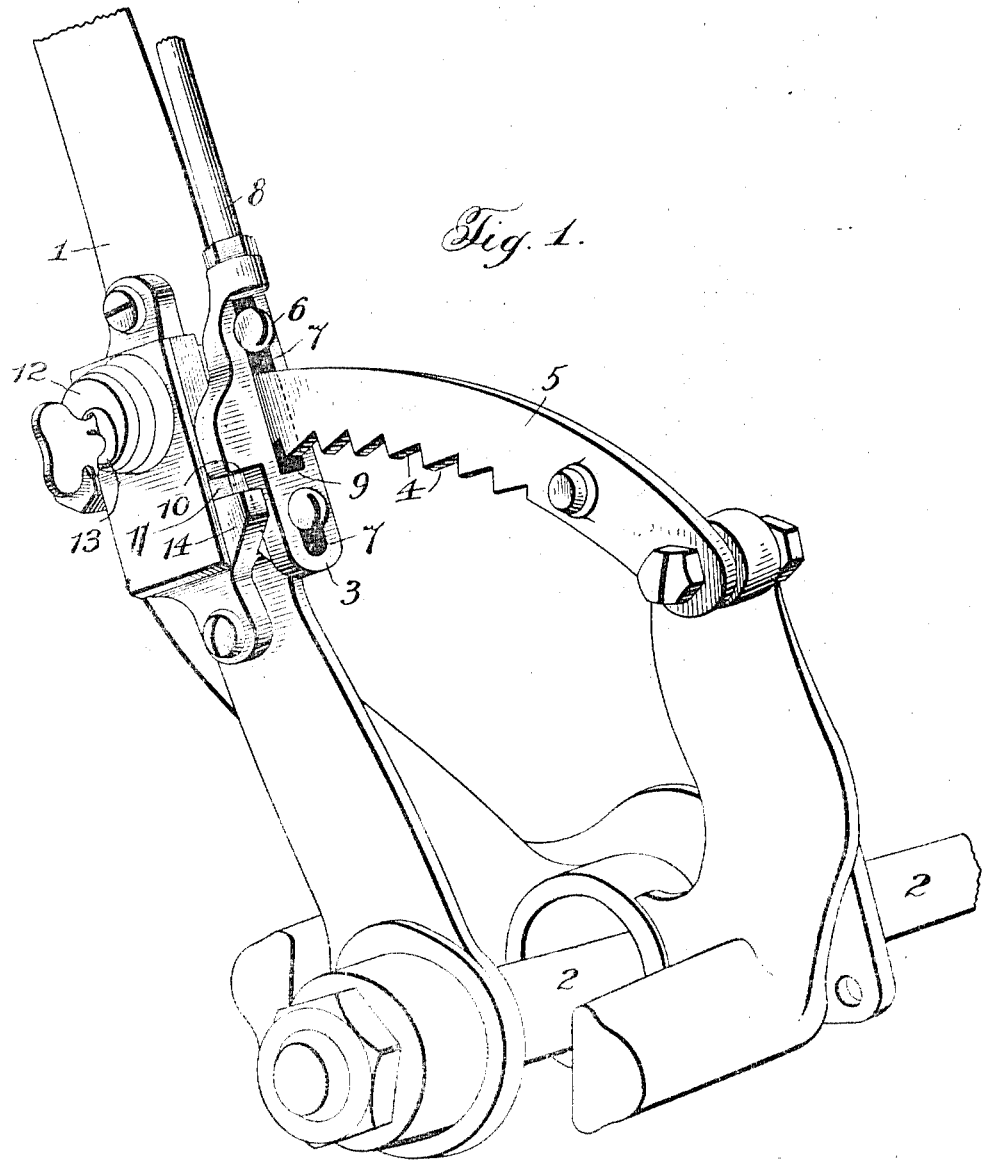

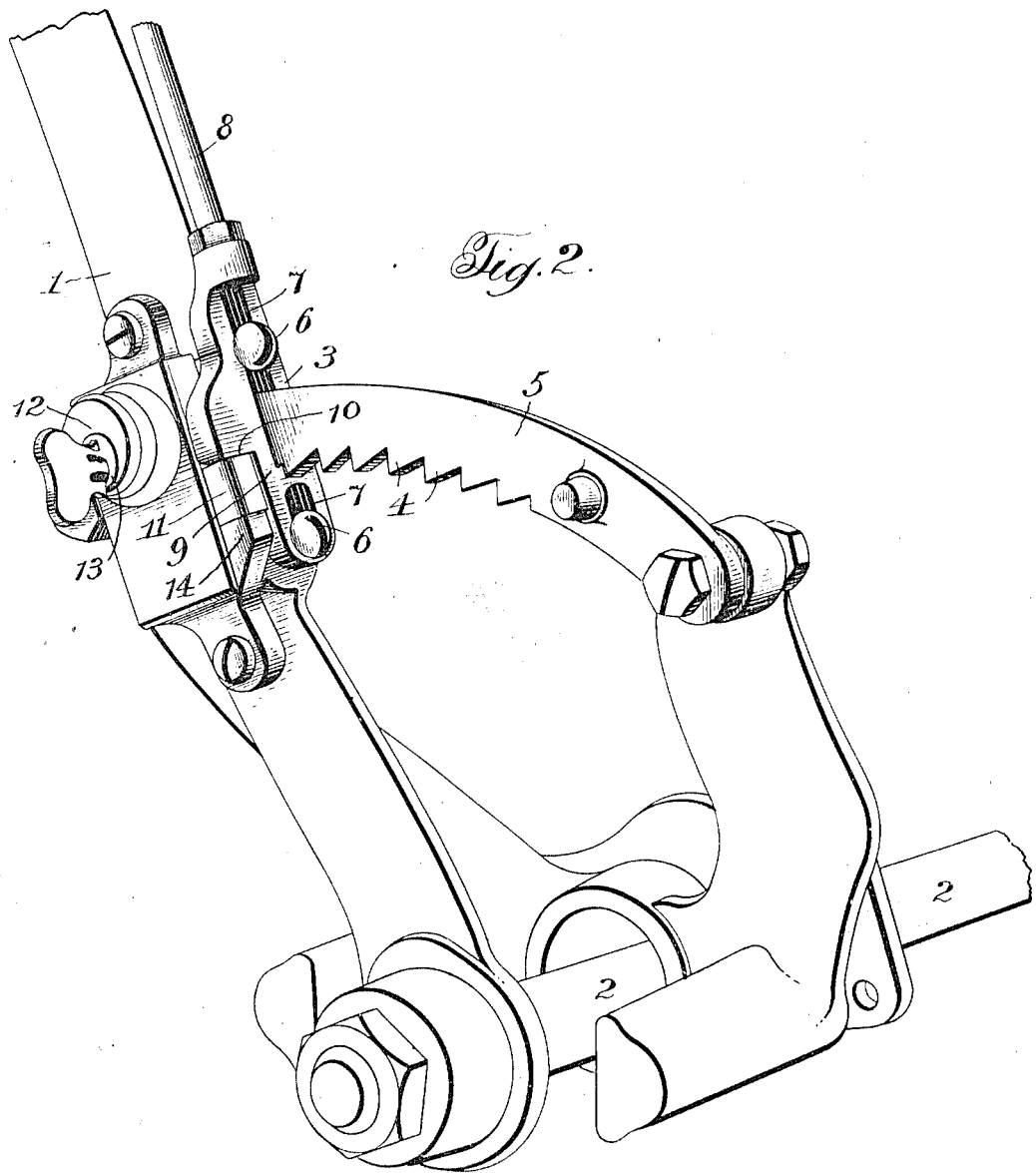

PETER F. AUGENBRAUN, OF STAMFORD, CONNECTICUT, ASSIGNOR TO THE YALE & TOWNE MANUFACTURING COMPANY, OF STAMFORD, CONNECTICUT.

BRAKE-LEVER LOCK.

1,040,844.      Specification of Letters Patent.      Patented Oct. 8, 1912.

Application filed September 9, 1909. Serial No. 516,984.

*To all whom it may concern:*

Be it known that I, PETER F. AUGENBRAUN, of Stamford, in the county of Fairfield and State of Connecticut, have invented certain new and useful Improvements in Brake-Lever Locks; and I do hereby declare the following to be a full, clear, and exact description of the invention, such as will enable others skilled in the art to which it appertains to make and use the same.

My invention relates to an improvement in devices for locking a lever against movement, and is designed more particularly for attachment to the brake levers of automobiles for preventing unauthorized operation of the machine.

The object of the invention is to provide means for locking the brake lever, so that when the brake is on and locked, the proper key must be used to release the brake before the machine can be started.

With this object in view, my invention consists in the parts and combination of parts as will be more fully described and pointed out in the claim.

In the accompanying drawings, Figure 1 is a view of a brake lever embodying my invention showing the lever free to be actuated and Fig. 2 is a view showing it locked.

1 represents a brake lever, secured to a brake shaft 2, and carrying the longitudinally movable locking dog 3, which latter engages the teeth 4 of the ratchet bar 5 for holding the lever against accidental movement. The locking dog 3 is slotted for the passage of the ratchet bar 5, and is loosely secured to lever 1 by screws 6 passing through elongated slots 7 in the dog 3, so as to permit the dog to have a longitudinal sliding movement on the lever. The dog is connected to the lower end of rod 8, which latter is provided at its upper end with a handle (not shown) for depressing the rod, and with a spring (not shown) for yieldingly holding the rod elevated, the handle and spring being any of the well known forms now commonly used on this type of levers.

The spring normally tends to hold the dog elevated with its shoulder 9 in contact with a tooth 4 on the lower edge of the ratchet bar, hence in order to release and shift the lever in a direction to release the brake, the dog 3 must be moved downwardly to permit its shoulder 9 to be clear of the ratchet teeth. This dog is provided with a laterally projecting integral shoulder 10, which normally rests in approximately the plane of the upper edge of the bolt 11 of the lock 12. This lock in the present instance comprises a casing secured to the lever 1 and carrying the bolt 11, and a pin tumbler lock 13 secured in the casing and actuating the bolt in the usual and well known manner. The bolt is located in a position to pass under the shoulder 10 of the dog 3 and when projected, as shown in Fig. 2, absolutely prevents the dog 3 from being depressed, and thus locks the lever 1 to the rack bar 5. In order to release the lever, the bolt 11 must be retracted by the proper key actuating the pin tumbler lock 13.

In order to prevent the bolt 11 from being forced down by pressure applied to the dog 3, or directly to the bolt, I provide the lock 12 or the lever 1 with an integral abutment 14 which latter forms a seat for the bolt when the latter is projected, thus reinforcing the bolt, and preventing it from being dislodged. In the drawings I have shown the seat 14 integral with the casing 12, but it will be apparent that it can be formed on or secured to the lever 1, and when formed on the lever, any force or pressure directed against the bolt will be transmitted through the abutment 14 to the lever 1 and not to the casing of the lock 12, hence may in some instances be preferred to the construction shown in Figs. 1 and 2.

When the bolt is projected as shown in Fig. 2, the lever 1 will be locked against any unauthorized manipulation. When however the bolt is retracted as in Fig. 1, the dog is free to be disengaged from the ratchet, and thus permit the lever to be shifted.

It is evident that many slight changes might be resorted to in the relative arrangement of the parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

The combination with a lever carrying a movable dog, and a toothed bar adapted to be engaged by said dog, of a fixed abutment located in the plane of a portion of said movable dog, and a lock secured to the lever and having a bolt adapted to be projected between said fixed abutment and the movable dog and engage both.

In testimony whereof, I have signed this specification in the presence of two subscribing witnesses.

PETER F. AUGENBRAUN.

Witnesses:
JOSEPH A. HORNE,
ELLIS H. JONES.